United States Patent
Laas et al.

(10) Patent No.: US 7,148,295 B2
(45) Date of Patent: Dec. 12, 2006

(54) CARBOXY-FUNCTIONAL CROSSLINKERS FOR EPOXY-FUNCTIONAL POWDER-LACQUER BINDING AGENTS

(75) Inventors: Hans-Josef Laas, Bergisch Gladbach (DE); Christoph Gürtler, Köln (DE); Reinhard Halpaap, Odenthal (DE); Michael Grahl, Leverkusen (DE); Peter Thometzek, Stuttgart (DE); James Rawlins, Leverkusen (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 10/873,379

(22) Filed: Jun. 21, 2004

(65) Prior Publication Data

US 2004/0265597 A1    Dec. 30, 2004

(30) Foreign Application Priority Data

Jun. 26, 2003  (DE) ................. 103 28 664

(51) Int. Cl.
*C08L 63/00* (2006.01)

(52) U.S. Cl. ................. 525/533; 428/413; 428/522; 525/934

(58) Field of Classification Search ............ None
See application file for complete search history.

(56) References Cited

U.S. PATENT DOCUMENTS

| | | | | |
|---|---|---|---|---|
| 3,781,379 | A | 12/1973 | Theodore et al. | 260/836 |
| 4,091,048 | A | 5/1978 | Labana et al. | 260/836 |
| 4,181,642 | A | 1/1980 | Holle et al. | 260/37 EP |
| 4,208,488 | A * | 6/1980 | Kraft et al. | 525/107 |
| 4,698,383 | A * | 10/1987 | Mertz et al. | 524/314 |
| 5,055,524 | A | 10/1991 | Pettit, Jr. et al. | 525/172 |
| 5,262,510 | A * | 11/1993 | Kwon et al. | 528/112 |
| 6,084,009 | A | 7/2000 | Mizoguchi et al. | 523/201 |
| 6,130,297 | A * | 10/2000 | Ramesh | 525/327.3 |
| 6,197,883 | B1 * | 3/2001 | Schimmel et al. | 525/111 |
| 6,268,433 | B1 | 7/2001 | Barkac et al. | 525/92 F |
| 6,359,067 | B1 | 3/2002 | Miyawaki et al. | 525/88 |
| 6,472,085 | B1 | 10/2002 | Barkac et al. | 428/520 |
| 6,506,820 | B1 * | 1/2003 | Satoh et al. | 523/340 |
| 2002/0010266 | A1 | 1/2002 | Barkac et al. | 525/88 |
| 2003/0111225 | A1 * | 6/2003 | Huang et al. | 166/307 |

FOREIGN PATENT DOCUMENTS

| | | |
|---|---|---|
| CA | 2064292 | 10/1992 |
| GB | 1 338 204 | 11/1973 |
| GB | 1 562 408 | 9/1976 |

OTHER PUBLICATIONS

"Dodencanedioic Acid (DDDA) HOOC(CH$_2$)10COOH Curing Agent Applications in Acrylic Powder Coatings".

* cited by examiner

*Primary Examiner*—Marc S. Zimmer
(74) *Attorney, Agent, or Firm*—Joseph C. Gil; Thomas W. Roy

(57) ABSTRACT

The invention relates to the use of special mixtures of at least two polycarboxylic acids as crosslinker components for thermally curing powder-lacquer binding agents having groups that are capable of reacting with carboxyl groups. The mixtures include at least two polycarboxylic acids each melting above 95° C. and having up to 20 carbon atoms and consist of at least 5 wt. %, of the polycarboxylic acid with the lowest melting point and at least 10 wt. %, of the polycarboxylic acid with the highest melting point of all polycarboxylic acids present in the mixture to at least 5 wt. %. Additionally, the polycarboxylic acid mixture is a solid below 40° C. and a liquid above 160° C.

11 Claims, No Drawings

CARBOXY-FUNCTIONAL CROSSLINKERS FOR EPOXY-FUNCTIONAL POWDER-LACQUER BINDING AGENTS

CROSS REFERENCE TO RELATED PATENT APPLICATION

The present patent application claims the right of priority under 35 U.S.C. §119 (a)–(d) of German Patent Application No.103 28 664.0, filed Jun. 26, 2003.

FIELD OF THE INVENTION

The invention relates to the use of special mixtures of at least two polycarboxylic acids as crosslinker components for thermally curing powder-lacquer binding agents having groups that are capable of reacting with carboxyl groups, in particular as crosslinkers for epoxy-functional powder-lacquer binding agents.

BACKGROUND OF THE INVENTION

Powder lacquers based on epoxy-functional binding agents are known and are the subject of a large number of publications (see, for example, EP-B 0 509 393, page 2, lines 6 to 17). Polycarboxylic acids, including in particular the aliphatic dicarboxylic acids, the anhydrides and polyanhydrides thereof, or even carboxy-functional polyesters or polyacrylates, are described as examples of suitable crosslinkers for powder-lacquer binding agents of such a type. Of the large number of possible crosslinker components that have been proposed, however, dodecanedioic acid finds application almost exclusively in practice nowadays. Powder coatings cured with this dodecanedioic acid are distinguished at comparatively moderate stoving temperatures by very good optical properties, in particular by outstanding flow. Therefore such powder-lacquer systems have also been employed in the meantime as clear lacquer in the initial lacquering of automobiles.

The particular suitability of dodecanedioic acid as a powder-lacquer crosslinker is attributed, inter alia, to the very low solubility, in the solid state, of the crystalline acid in glycidyl-functional copolymers, particularly glycidyl methacrylates (GMA). By reason of its sharp melting-point, which lies within the range of the crosslinking-temperature, and by reason of its special melting behaviour, dodecanedioic acid enables, in combination with typical GMA resins, the production of powder coatings that, in comparison with those which have been cured with azelaic acid or sebacic acid, for example, exhibit a superior hardness, superior gloss and also better mechanical and chemical resistances (see, for example, Technical Information "Dodecanedioic Acid (DDDA): Curing Agent Applications in Acrylic Powder-Coatings"; DuPont Nylon Intermediates and Specialties; October 1997).

However, the exclusive concentration on dodecanedioic acid as crosslinker component for epoxy-functional powder-lacquer binding agents is not unproblematic for the technical application. Given a base of raw material that has been restricted in such a manner, bottlenecks in supply, or even simply fluctuations in the quality of the raw material, can very easily lead to an impairment of the provisioning of the lacquering plants with adequate amounts of powder lacquer. Furthermore, the high cost of dodecanedioic acid has until now precluded greater market success of acid-cured GMA powder lacquers.

The object of the present invention was therefore to make available novel carboxy-functional crosslinker components for epoxy-functional powder-lacquer binding agents, said crosslinker components being based on readily available and inexpensive raw materials and curing in combination with the customary GMA resins so as to form coatings that correspond, at least in their quality, to those which have been crosslinked with dodecanedioic acid.

SUMMARY OF THE INVENTION

The present invention is directed to a polycarboxylic acid mixture that includes at least two polycarboxylic acids, each melting above 95° C. and having up to 20 carbon atoms. The present mixture includes polycarboxylic acids having different melting temperatures and consists of at least 5 wt. %, of the polycarboxylic acid with the lowest melting point and at least 10 wt. %, of the polycarboxylic acid with the highest melting point of all polycarboxylic acids present in the mixture to at least 5 wt. %. Further, the polycarboxylic acid mixture is a solid below 40° C. and liquid above 160° C.

The present invention is also directed to a thermally curing powder lacquer that includes A) a binding-agent component containing groups that are capable of reacting with carboxylic acid groups and B) the above described mixture containing at least two polycarboxylic acids. Components A) and B) are present in such quantitative ratios that from 0.7 to 1.5 carboxyl groups of component B) are allotted to each group of component A) that is capable of reacting with carboxyl groups.

The present invention is further directed to a method of coating a substrate that includes applying the above-described powder lacquer to the substrate, as well as substrates coated by such a method.

The present invention is additionally directed to a method of making lacquers for automobiles including combining in the above-described powder lacquer one or more materials selected from curing catalysts, pigments, fillers and flow-control agents.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

As a result of the invention, special polycarboxylic-acid mixtures as crosslinkers have been discovered that can be used as components for epoxy-functional powder-lacquer binding agents. The novel crosslinker components are based on readily available and inexpensive raw materials and cure in combination with customary GMA resins so as to form coatings that correspond, at least in their quality, to those which have been crosslinked with dodecanedioic acid.

The present invention is based on the surprising observation that polycarboxylic acids that cannot be employed on their own or that can only be employed on their own to a limited extent as powder-lacquer crosslinkers are outstandingly suitable, in the form of special-mixtures with one another, as crosslinker components for epoxy-functional powder-lacquer binding agents. Although in the Technical Information entitled "Dodecanedioic Acid", produced by DuPont and cited above, it is pointed out explicitly that azelaic acid and sebacic acid are less well suited as powder-lacquer crosslinkers, special mixtures of these two dicarboxylic acids, for example, in combination with customary GMA resins yield lacquer films that not only are in no way inferior to those cured with dodecanedioic acid but that are distinguished, moreover, by further improved optical properties.

Although in EP-A 0 997 501, U.S. Pat. No. 6,084,009 and WO 00/12581, for example, which describe very special powder-lacquer compositions based on acid-curing GMA resins, within long lists of polycarboxylic acids that are suitable as crosslinkers the possible use of polycarboxylic-acid mixtures is also mentioned in a generalised way, a person skilled in the art could not gather indications of any kind from these publications as to which mixtures might actually be suitable for this purpose, and these publications lack any indication of the particular suitability of the polycarboxylic-acid mixtures to be employed in accordance with the invention. Rather, in the exemplifying embodiments of these published applications individual dicarboxylic acids, such as dodecanedioic acid or sebacic acid, or alternatively polyanhydrides such as, for example, dodecanedioic polyanhydride, are used exclusively as crosslinkers.

The use, described in greater detail below, of certain polycarboxylic-acid mixtures as crosslinker component for epoxy-functional powder-lacquer binding agents has not previously been described.

The present invention therefore provides polycarboxylic-acid mixtures that are solid below 40° C. and liquid above 160° C., said mixtures consisting of at least two polycarboxylic acids each melting above 95° C. with up to 20 carbon atoms, and said mixtures consisting, in a proportion amounting to at least 5 wt. %, of the polycarboxylic acid with the lowest melting-point and, in a proportion amounting to at least 10 wt. %, of the polycarboxylic acid with the highest melting-point of all the polycarboxylic acids present in the mixture in a proportion amounting to at least 5 wt. %.

The present invention therefore also provides thermally curing powder lacquers consisting of
A) a binding-agent component comprising groups that are capable of reacting with carboxyl groups and
B) a crosslinker component that is a mixture, which is present in solid form below 40° C. and in liquid form above 160° C., of at least two polycarboxylic acids each melting above 95° C. with up to 20 carbon atoms, said mixture consisting, in a proportion amounting to at least 5 wt. %, of the polycarboxylic acid with the lowest melting-point and, in a proportion amounting to at least 10 wt. %, of the polycarboxylic acid with the highest melting-point of all the polycarboxylic acids present in the mixture in a proportion amounting to at least 5 wt. %, and also, optionally,
C) further auxiliary agents and additives known from powder-lacquer technology, with the proviso that the components A) and B) are present in such quantitative ratios that from 0.7 to 1.5 carboxyl groups of component B) are allotted to each group of component A) that is capable of reacting with carboxyl groups.

The invention also provides the use of these powder lacquers for the purpose of coating arbitrary substrates, in particular for the purpose of producing clear-lacquer layers for automobiles, as well as substrates that are coated with said lacquers.

The powder lacquers according to the invention contain by way of binding-agent component A) the powder-lacquer binding agents known as such, having groups that are capable of reacting with carboxyl groups. In this connection it is a question, for example, of the known epoxy-functional powder-lacquer binding agents, preferably of polyacrylate resins containing epoxide groups, which may be prepared in accordance with methods known from the literature by copolymerisation of at least one ethylenically unsaturated monomer that contains at least one epoxide group in the molecule with at least one other ethylenically unsaturated monomer that contains no epoxide group in the molecule. Suitable polyacrylate resins containing epoxide groups are described, for example, in EP-A 0 299 420, DE-A 2 214 650, DE-A 2 749 576, U.S. Pat. No. 4,091,048 and U.S. Pat. No. 3,781,379.

The epoxy-functional monomers that are employed for preparing the epoxy-functional powder-lacquer binding agents A) are, in particular, glycidyl acrylate, glycidyl methacrylate and allyl glycidyl ether. As examples of ethylenically unsaturated monomers that contain no epoxide group in the molecule, the following may be named in exemplifying manner: alkyl esters of acrylic and methacrylic acid with up to 18, preferably up to 8, carbon atoms in the alkyl residue, such as, for example, methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, 2-ethylhexyl acrylate, 2-ethylhexyl-methacrylate, neopentyl acrylate, neopentyl methacrylate, stearyl methacrylate, the cyclohexyl, isobornyl, 3,3,5-trimethylcyclohexyl, phenyl, benzyl or 2-phenyl esters of acrylic acid and methacrylic acid, but also dialkyl esters or cycloalkyl esters of maleic or fumaric acid with up to 8 carbon atoms in the alkyl residues, such as, for example, dimethyl maleate, diethyl maleate, diisopropyl maleate, diisobutyl maleate, di-tert-butyl maleate, dicyclohexyl maleate and the corresponding dialkyl esters of fumaric acid.

Further examples of ethylenically unsaturated monomers that contain no epoxide groups in the molecule are acid amides, such as, for example, acrylic and methacrylic acid amide, vinyl aromatic compounds, such as, for example, styrene, methylstyrene and vinyltoluene, nitriles, such as, for example, acrylonitrile and methacrylonitrile, vinyl and vinylidene halides, such as, for example, vinyl chloride and vinylidene fluoride, vinyl esters, such as, for example, vinyl acetate, as well as hydroxyalkyl esters of acrylic or methacrylic acid with 2 to 8, preferably 2 to 4, carbon atoms in the hydroxyalkyl residue, such as, for example, hydroxyethyl acrylate, hydroxyethyl methacrylate, hydroxypropyl acrylate, hydroxypropyl methacrylate, in particular the addition products of propylene oxide on acrylic or methacrylic acid, and 2- or 4-hydroxybutyl acrylate or methacrylate.

The epoxy-functional polyacrylate resins that are employed preferably in the powder lacquers according to the invention as binding-agent component A) ordinarily have a glass transition temperature (Tg), determined by differential scanning calorimetry (DSC), within the range from 20° C. to 100° C., preferably from 30° C. to 90° C., and an average molecular weight (Mw), determined by gel-permeation chromatography using polystyrene as standard, from 1500 to 30,000, preferably 2000 to 20,000. The epoxy equivalent weight amounts to 365 to 2840, preferably 430 to 1420.

Also suitable in principle by way of epoxy-functional powder-lacquer binding agent A) are epoxy-functional polycondensation resins, such as, for example, the known conversion products of epichlorohydrin with polyhydric phenols and also novolaks based on phenol.

The binding-agent components A) described above are combined in the powder lacquers according to the invention with the carboxy-functional crosslinker components B) according to the invention. In this connection it is a question of mixtures, which are present in solid form below 40° C. and in liquid form above 160° C., of at least two polycarboxylic acids melting above 95° C. with up to 20 carbon atoms, said mixtures consisting, in a proportion amounting to at least 5 wt. %, of the polycarboxylic acid with the lowest melting-point and, in a proportion amounting to at least 10 wt. %, of the polycarboxylic acid with the highest melting-point of all the polycarboxylic acids present in the mixture in a proportion amounting to at least 5 wt. %.

Suitable polycarboxylic acids for preparing polycarboxylic-acid mixtures B) are arbitrary polybasic carboxylic acids of aliphatic, cycloaliphatic, aromatic and/or heteroaromatic nature that comprise up to 20 carbon atoms and that may optionally be substituted, for example by halogen atoms, and/or unsaturated. Suitable are, for example, difunctional and trifunctional carboxylic acids within the molecular-weight range from 104 to 370, such as, for example, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, the isomeric cyclohexanedicarboxylic acids, maleic acid, phthalic acid, isophthalic acid, terephthalic acid, tetrahydrophthalic acid, trimellitic acid or the isomeric pyridinedicarboxylic acids.

Particularly suitable polycarboxylic acids are the saturated aliphatic and/or cycloaliphatic dicarboxylic acids with 4 to 20 carbon atoms-or mixtures thereof. Most particularly preferred are the stated linear aliphatic dicarboxylic acids with 5 to 12 carbon atoms.

In accordance with the invention, mixtures of at least two, preferably at least three, such polycarboxylic acids are used as crosslinkers for epoxy-functional powder-lacquer binding agents.

The polybasic carboxylic acids employed for preparing the polycarboxylic-acid mixtures frequently contain, in the grade thereof that is available on a technical scale, more or less large quantities of side-products, optionally including further polycarboxylic acids in subordinate amounts. However, such polycarboxylic acids which are "contaminated" with other polycarboxylic acids do not represent polycarboxylic-acid mixtures in the sense of the present invention. Rather, in accordance with the invention polycarboxylic-acid mixtures are used in which the polycarboxylic acids are present in such quantitative ratios that the polycarboxylic acid with the lowest melting-point of all the polycarboxylic acids present in the mixture in a proportion amounting to at least 5 wt. % is contained in a proportion amounting to at least 5 wt. %, preferably at least 10 wt. %, most particularly prefererably at least 15 wt. %, and the polycarboxylic acid with the highest melting-point of all the polycarboxylic acids present in the mixture in a proportion amounting to at least 5 wt. % is contained in a proportion amounting to at least 10 wt. %, preferably at least 20 wt. %, most particularly preferably at least 25 wt. %.

The powder lacquers according to the invention optionally contain further auxiliary agents and additives C), such as, for example, curing catalysts, pigments, fillers or flow-control agents.

In the case of the catalysts that are optionally to be used concomitantly for the purpose of accelerating curing, as a rule it is a question of the customary compounds known from the literature that are suitable for accelerating the reaction between carboxyl and epoxide groups, for example tetraalkylammonium salts such as, for example, tetrabutylammonium chloride, bromide or iodide, tetraethylammonium chloride, bromide or iodide, trimethylbenzylammonium chloride, dodecyldimethyl(2-phenoxyethyl) ammonium bromide or diethyl(2-hydroxyethyl) methylammonium bromide, catalysts with imidazole structure, such as, for example, imidazole, 2-methylimidazole, 2-methyl-4-ethylimidazole, 2[(N-benzylanilino)methyl]-2-imidazoline phosphate or 2-benzyl-2-imidazoline hydrochloride, tertiary amines, such as, for example, N,N-dimethylcyclohexyl-amine, N,N-diethylcyclohexylamine, N-methylpiperidine, N-methylmorpholine, pentamethyl diethylenetriamine, N,N'-dimethylpiperazine or 1,4-diazabicyclo[2,2,2]octane, or metal salts such as, for example, aluminium tri(ethylacetoacetate), zinc chloride, zinc(II)-n-octoate, zinc(II)-2-ethyl-1-hexanoate, zinc(II)-2-ethylcaproate, zinc(II) stearate, zinc(II) naphthenate, zinc(II) acetylacetonate, tin(II)-n-octoate, tin(II)-2-ethyl-1-hexanoate, tin (II) ethylcaproate, tin(II) laurate, tin(II) palmitate, dibutyltin (IV) oxide, dibutyltin(IV) dichloride, dibutyltin(IV) diacetate, dibutyltin(IV) dimaleate, dibutyltin(IV) dilaurate, dioctyltin(IV) diacetate, molybdenum glycolate, or arbitrary mixtures of such catalysts.

These catalysts may optionally be added in quantities of, preferably, 0.01 wt. % to 5.0 wt. %, particularly preferably 0.05 wt. % to 2.0 wt. %, relative to the total quantity of organic binding agent, i.e. polycarboxylic-acid mixtures in combination with the epoxy-functional powder-lacquer binding agents but excluding the further auxiliary substances and additives which are used optionally.

Further auxiliary agents and additives C) which may be optionally added in the course of production of the powder lacquers are, for example, the customary pigments and fillers, the flow-control agents known from powder-lacquer technology, such as, for example, polybutyl acrylate or those based on polysilicones, light stabilisers, such as, for example, sterically hindered amines, UV-absorbers, such as, for example, benzotriazoles or benzophenones, as well as colour stabilisers for countering the risk of yellowing due to overstoving, such as, for example, trialkyl, triaryl and/or trisalkylphenyl phosphites which optionally comprise inert substituents.

With a view to producing a ready-to-use powder lacquer according to the invention, the epoxy-functional powder-lacquer binding agents A) and polycarboxylic-acid mixtures B) described above are mixed, are optionally added to further auxiliary agents and additives C), and are combined, for example in extruders or kneaders, as a rule at temperatures above the melting-range of the individual components, for example at temperatures from 70° C. to 130° C., preferably from 70° C. to 110° C., so as to form a homogeneous material.

In this case the polybasic carboxylic acids forming the polycarboxylic-acid mixture in the given case may be mixed, for example as individual components and in arbitrary sequence, with the epoxy-functional polyacrylate resins A) and with the auxiliary agents and additives C) optionally used concomitantly.

However, in a step placed ahead of the actual production of powder lacquer the individual polybasic carboxylic acids are preferably premixed in the mixing ratio specified above in such a way as to result in homogeneous polycarboxylic-acid mixtures B). This can be effected, for example, in a melt at temperatures above the mixed melting-point of the individual components, preferably within the temperature-range from 95° C. to 170° C., particularly preferably from 100° C. to 150° C. However, it is also possible, for example, to mix the polybasic carboxylic acids with one another in dissolved form in suitable solvents or solvent mixtures and, in a subsequent process step, to free the resulting homogeneous polycarboxylic-acid mixtures B) from the solvent, for example by spray drying or in an evaporative screw.

Irrespective of the manner of addition, for example as individual components or in premixed form, in the course of the production of powder lacquer the polycarboxylic-acid mixtures B) described above are combined with the preferably epoxy-functional powder-lacquer binding agents A) that are reactive with carboxyl groups in quantities that correspond to an equivalent ratio of carboxyl groups to groups, in particular epoxide groups, that are capable of reacting with carboxyl groups from 1.5:1 to 0.7:1, preferably from 1.3:1 to 0.8:1, particularly preferably 1.1:1 to 0.9:1.

Production of the powder lacquers according to the invention is preferably effected, as described above, in a solvent-free process in a melt. However, it is of course also possible to mix all the individual components A); B), C) of the powder-lacquer system with one another in dissolved form in suitable solvents or solvent mixtures.

Suitable solvents for this less preferred way of proceeding are, for example, the customary lacquer solvents known as such, such as, for example, ethyl acetate, butyl acetate, ethylene glycol monomethyl ether acetate, ethylene glycol monoethyl ether acetate, 1-methoxypropyl-2-acetate, 2-butanone, 4-methyl-2-pentanone, cyclohexanone, toluene, or mixtures thereof, but also solvents such as acetone, propylene glycol diacetate, diethylene glycol dimethyl ether, diethylene glycol ethyl ether acetate, diethylene glycol butyl ether acetate, N-methylpyrrolidone, N-methylcaprolactam, N,N-dimethylformamide, N,N-dimethylacetamide and methylene chloride or mixtures of such solvents.

After homogenisation of the individual components has taken place, these solvents which are optionally used concomitantly are separated from the powder lacquer according to the invention with the aid of suitable methods, for example by precipitation and simple removal by suction, spray drying or melt extrusion in an evaporative screw.

Irrespective of the process chosen for the production of powder lacquer, the solids resulting after cooling of the extrusion melt or removal of the solvents used concomitantly is subsequently ground and freed, by sieving, of the granular portions above the desired grain size, for example above 0.1 mm.

The ready-to-spray powder lacquer produced in this way can be applied by customary powder-application processes, such as, for example, electrostatic powder spraying or whirl sintering, onto the substrates to be covered. In accordance with the invention, arbitrary heat-resistant substrates, such as, for example, those made of metals, plastics, wood or glass, can be coated. The powder-lacquer formulations prepared in accordance with the invention preferably serve for the production of coatings for automobile applications, in particular for the production of clear lacquers for automobiles.

Curing of the coatings is effected by heating to temperatures from 110° C. to 220° C., preferably 130° C. to 180° C., for example during a period from 10 minutes to 60 minutes, preferably 10 minutes to 30 minutes. Hard and elastic coatings are obtained that have good solvent resistance and resistance to chemicals and that exhibit outstanding flow. As the following examples show, the powder lacquers according to the invention, which contain special polycarboxylic-acid mixtures as crosslinker components, result in coatings that, in comparison with those which have been cured with pure polycarboxylic acids, in particular with dodecanedioic acid, exhibit at least equally good chemical and mechanical resistances but are distinguished, moreover, by a distinctly superior gloss.

EXAMPLES

The following examples serve for further elucidation of the invention.

Preparation of Polycarboxylic-acid Mixtures B)

Polycarboxylic-acid Mixture B)

300 g adipic acid (melting-point: 148° C.) and 700 g sebacic acid (melting-point: 131° C.) were charged together in a ground-joint vessel under dry nitrogen and were melted down at a temperature of 140° C. The melt was stirred intensely for 5 min and was subsequently poured onto a metal sheet in order to cool. After cooling to room temperature, a polycarboxylic-acid mixture was present having a melting-point of 120° C. and an equivalent weight of 89 g/g equiv. COOH.

Polycarboxylic-Acid Mixtures B2) to B6)

Polycarboxylic-acid mixtures were produced by the process described above, using sebacic acid (m.p.: 131° C.), azelaic acid (m.p.: 101° C.), dodecanedioic acid (m.p.: 129° C.) and adipic acid (m.p.: 148° C.). The following table shows the compositions and characteristic data of the polycarboxylic-acid mixtures that were produced:

| Polycarboxylic-acid mixture | B2) | B3) | B4) | B5) | B6) |
|---|---|---|---|---|---|
| Sebacic acid [parts by weight] | 20 | 40 | — | — | 40 |
| Azelaic acid [parts by weight] | 80 | 60 | — | — | — |
| Dodecanedioic acid [parts by weight] | — | — | 80 | 60 | 40 |
| Adipic acid [parts by weight] | — | — | 20 | 40 | 20 |
| Melting-point [° C.] | 96 | 108 | 121 | 132 | 102 |
| Equivalent weight [g/g equiv. COOH] | 95 | 96 | 101 | 94 | 98 |

Example 1

(Acc. to the Invention [a] and Comparison [b])

[a] 81.0 parts by weight of a commercial polyacrylate containing glycidyl groups (Almatex® PD 7610, Anderson Development Company, Adrian, Mich.) with an epoxide content of 7.8 wt. % (equivalent weight 551 g/g equiv. epoxide) were mixed thoroughly with 17.4 parts by weight of the polycarboxylic-acid mixture B1), corresponding to an equivalent ratio of carboxyl groups to glycidyl groups of 1:1, 1.0 parts by weight of a commercial flow-control agent (Worlée Add 101, Worlée-Chemie GmbH, Hamburg), 0.3 parts by weight tin(II) palmitate as catalyst and 0.3 parts by weight benzoin and were subsequently homogenised with the aid of a twin-shaft extruder manufactured by APV Baker Inc. (Grand Rapids, Mich.) of type MP 19 PC at 300 rpm and at a casing temperature of 100° C. to 110° C. in the process part. After cooling, the solidified melt is ground and sieved with the aid of a separator mill ICM 4 (Neumann & Esser Deutschland GmbH & Co. KG, Übach-Palenberg) with a sieve having a mesh width of 90 μm.

[b] For comparison, a clear powder lacquer was produced in analogous manner from 81.0 parts by weight Almatex® PD 7610 with 17.4 parts by weight dodecanedioic acid as crosslinker, with 1.0 parts by weight Worlée Add 101, with 0.3 parts by weight tin(II) palmitate and with 0.3 parts by weight benzoin. The equivalent ratio of carboxyl groups to glycidyl groups was likewise 1:1.

The two powder lacquers obtained in this way were sprayed with an ESB cup gun at a high voltage of 70 kV onto degreased, grey-precoated coilcoat steel sheets and were each cured for 30 min at a temperature of 145° C. Both coatings show outstanding flow. In the case of layer thicknesses of about 70 μm, the following lacquer properties were found:

Clear powder lacquer crosslinked with

| | Polycarboxylic-acid mixture B1) (acc. to invention [a]) | Dodecanedioic acid (comparison [b]) |
|---|---|---|
| Gelling-time/160° C. [s] | 69 | 83 |
| Flow (visual) a) | ++ | ++ |
| Pendulum hardness b) [s] | 170 | 171 |
| Gloss c) | | |
| 20° | 81.8 | 76.8 |
| 60° | 91.5 | 90.3 |
| 85° | 99.4 | 96.0 |
| Yellowing d) Δb | 0.36 | 0.33 |
| Acetone test e) | | |
| DS | 50 | 50 |
| verdict | 0 | 0 | a) assessment: ++ very good, + good, 0 moderate, − poor
b) pendulum hardness acc. to König (DIN 53157)
c) gloss = gloss acc. to Gardner; 20°, 60° and 85° angle of reflection
d) b-value of the undersurface: −4.27
e) DS = number of double strokes with impregnated cotton swab
verdict: 0 = film intact
1 = film surface slightly softened
2 = film swollen down to undersurface
3 = film dissolved
m = matt (loss of gloss)

The comparison shows that, in comparison with the lacquer crosslinked with dodecanedioic acid, the powder lacquer according to the invention, which contains a crosslinker component based on the inexpensive dicarboxylic acids adipic acid and sebacic acid, exhibits a higher reactivity and is distinguished by a superior gloss.

For the purpose of investigating the stability in storage, samples of the two powder lacquers were stored at a temperature of 40° C. and were examined for flowability at regular intervals. Both powders were unchanged after storage for 14 days; no lumps of any kind appeared.

Examples 2 to 7 (According to the Invention) and 8 to 10 (Comparison)

Powder lacquers were produced by the process described in Example 1, starting from the polyacrylate containing glycidyl groups Almatex® PD 7610 and the polycarboxylic-acid mixtures B2) to B6). The powder lacquer from Example 7 corresponds in its gross composition to the powder lacquer from Example 2. In Example 7, however, the dicarboxylic acids forming the crosslinker mixture were not admixed to the formulation in premixed form but rather as individual components.

For comparison, powder lacquers were produced in analogous manner that each contained only one individual dicarboxylic acid as crosslinker.

With an ESB cup gun all the powder lacquers were sprayed at a high voltage of 70 kV onto degreased steel sheets and were cured for 30 min at 145° C. The following table shows the compositions (parts by weight) of the powder lacquers and also the technical lacquer data pertaining to the coatings obtained therefrom (assessment as in Example 1).

The examples prove that the powder lacquers 2 to 7 according to the invention, which were produced using polycarboxylic-acid mixtures, result in coatings that are distinguished by a superior gloss in comparison with the powder lacquers that were cured with pure dicarboxylic acids (1[b] and 8 to 10).

As described in Example 1, samples of the powder lacquers 2 to 10 were stored at a temperature of 40° C. with a view to investigating the stability in storage. With the exception of the powder lacquer from Comparative Example 9, which showed agglomeration after just 1 day, all the powder lacquers remained free-flowing over a period of 14 days.

| | | | | | Example | | | | | |
|---|---|---|---|---|---|---|---|---|---|---|
| | | 2 | 3 | 4 | 5 | 6 | 7 | 8 (comparison) | 9 (comparison) | 10 (comparison) |
| Almatex ® PD 7610 | | 83.6 | 83.4 | 82.8 | 83.7 | 83.5 | 83.5 | 86.9 | 84.1 | 83.1 |
| Polycarboxylic-acid mixture | B2) | 14.8 | — | — | — | — | — | — | — | — |
| | B3) | — | 15.0 | — | — | — | — | — | — | — |
| | B4) | — | — | 15.6 | — | — | — | — | — | — |
| | B5) | — | — | — | 14.7 | — | — | — | — | — |
| | B6) | — | — | — | — | 14.9 | — | — | — | — |
| Adipic acid | | — | — | — | — | — | — | 11.5 | — | — |
| Azelaic acid | | — | — | — | — | — | 11.9 | — | 14.3 | — |
| Sebacic acid | | — | — | — | — | — | 3.0 | — | — | 15.3 |
| Worlée ® Add 101 | | 1.0 | 1.0 | 1.0 | 1.0 | 1.0 | 1.0 | 1.0 | 1.0 | 1.0 |
| Benzoin | | 0.3 | 0.3 | 0.3 | 0.3 | 0.3 | 0.3 | 0.3 | 0.3 | 0.3 |
| Tin(II) palmitate | | 0.3 | 0.3 | 0.3 | 0.3 | 0.3 | 0.3 | 0.3 | 0.3 | 0.3 |
| Gelling-time 160° C. [s] | | 71 | 74 | 67 | 62 | 66 | 76 | 50 | 79 | 81 |
| Layer thickness [μm] | | 62–72 | 52–74 | 73–78 | 53–56 | 63–70 | 69–78 | 53–65 | 59–73 | 66–71 |
| Pendulum hardness [s] | | 171 | 172 | 174 | 174 | 174 | 170 | 177 | 165 | 167 |
| Flow (visual) | | ++ | ++ | ++ | ++ | ++ | ++ | − | ++ | ++ |
| Gloss | 20° | 82.2 | 84.2 | 79.5 | 82.7 | 83.1 | 79.1 | 63.5 | 74.8 | 73.8 |
| | 60° | 91.4 | 91.6 | 91.5 | 91.7 | 91.6 | 89.8 | 81.2 | 85.7 | 83.3 |
| | 85° | 100.0 | 101.1 | 97.8 | 99.3 | 99.5 | 98.8 | 90.1 | 95.0 | 95.6 |

-continued

| | | Example | | | | | | | |
|---|---|---|---|---|---|---|---|---|---|
| | | 2 | 3 | 4 | 5 | 6 | 7 | 8 (comparison) | 9 (comparison) | 10 (comparison) |
| Yellowing Δb | | 0.28 | 0.31 | 0.30 | 0.35 | 0.32 | 0.30 | 0.30 | 0.56 | 0.33 |
| Acetone test | DS | 50 | 50 | 50 | 50 | 50 | 50 | 50 | 50 | 50 |
| verdict | | 0 | 0 | 0 | 0 | 0 | 0 | 0 | 0 | 0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermally curing powder lacquer comprising:
   A) a binding-agent component comprising groups that are capable of reacting with carboxylic acid groups and
   B) a crosslinker component that is a mixture, which is present in solid form below 40° C. and in liquid form above 160° C., said mixture consisting of at least two polycarboxylic acids each melting above 95° C. with up to 20 carbon atoms and selected from malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, the isomeric cyclohexanedicarboxylic acids, maleic acid, phthalic acid, isophthalic acid, terephthalic acid, tetrahydrophthalic acid, trimellitic acid and the isomeric pyridinedicarboxylic acids, said mixture containing at least 5 wt. % of the polycarboxylic acid with the lowest melting point and containing at least 10 wt. % of the polycarboxylic acid with the highest melting point, wherein the preceding percentages are based on the total weight of all of the polycarboxylic acids present in the mixture in an amount of at least 5 wt. %, and
   C) optionally further auxiliary agents and additives known from powder-lacquer technology,
provided that the components A) and B) are present in such quantitative ratios that from 0.7 to 1.5 carboxyl groups of component B) are allotted to each group of component A) that is capable of reacting with carboxyl groups.

2. The powder lacquer according to claim 1, wherein an epoxy-functional polyacrylate resin is employed as binding-agent component A).

3. The powder lacquer according to claim 1, wherein the lowest melting point polycarboxylic acid is present in an amount of at least 10 wt. %, and the highest melting point polycarboxylic acid is present in an amount of at least 20 wt. %, wherein the preceding percentages are based on the total weight of all of the polycarboxylic acids present in the mixture in an amount of at least 5 wt. %.

4. The powder lacquer according to claim 1, wherein the lowest melting point polycarboxylic acid is present in an amount of at least 15 wt. %, and the highest melting point polycarboxylic acid is present in an amount of at least 25 wt. %, wherein the preceding percentages are based on the total weight of all of the polycarboxylic acids present in the mixture in an amount of at least 5 wt. %.

5. The powder lacquer according to claim 1, wherein said mixture consists of at least two polycarboxylic acids selected from malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, and the isomeric cyclohexanedicarboxylic acids.

6. The powder lacquer according to claim 1, wherein said mixture consists of at least two polycarboxylic acids selected from malonic acid, succinic acid, glutaric acid, adipic acid, pimelic acid, suberic acid, azelaic acid, sebacic acid, undecanedioic acid, and dodecanedioic acid.

7. The powder lacquer according to claim 1, wherein said mixture consisting of at least three polycarboxylic acids selected from malonic acid, succinic acid, glutaric acid, adipic acid, pimelic acid, suberic acid, azelaic acid, sebacic acid, undecanedioic acid, and dodecanedioic acid.

8. The powder lacquer according to claim 1, wherein a mixture of polycarboxylic acids that has been homogeneously premixed in a step placed upstream of the production of powder lacquer is employed as crosslinker component B).

9. A method of coating a substrate comprising applying the powder lacquer according to claim 1 to the substrate.

10. A method of making clear lacquers for automobiles comprising using the powder lacquer according to claim 1.

11. Substrates coated according to the method of claim 9.

* * * * *